(12) United States Patent
Rabinowitz

(10) Patent No.: US 7,130,102 B2
(45) Date of Patent: Oct. 31, 2006

(54) DYNAMIC REFLECTION, ILLUMINATION, AND PROJECTION

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 111 days.

(21) Appl. No.: 10/894,241

(22) Filed: Jul. 19, 2004

(65) Prior Publication Data
US 2006/0012848 A1    Jan. 19, 2006

(51) Int. Cl.
*G02B 26/00* (2006.01)
*G02F 1/29* (2006.01)
*G09G 3/34* (2006.01)

(52) U.S. Cl. .......................... 359/290; 359/295; 359/296; 359/298; 359/316; 359/318; 345/85; 345/86; 345/107; 345/108; 345/111

(58) Field of Classification Search ................. 359/280, 359/282, 283, 295, 290–292, 296, 298, 315, 359/316, 318; 345/84–86, 107, 108, 111
See application file for complete search history.

(56) References Cited

U.S. PATENT DOCUMENTS

| | | | |
|---|---|---|---|
| 5,894,367 A * | 4/1999 | Sheridon | 359/623 |
| 5,914,805 A * | 6/1999 | Crowley | 359/296 |
| 6,612,705 B1 * | 9/2003 | Davidson et al. | 359/851 |
| 6,738,176 B1 * | 5/2004 | Rabinowitz et al. | 359/296 |
| 2003/0007234 A1 * | 1/2003 | Holmes | 359/290 |
| 2003/0193726 A1 * | 10/2003 | Davidson et al. | 359/850 |
| 2005/0034750 A1 * | 2/2005 | Rabinowitz | 136/243 |
| 2005/0195465 A1 * | 9/2005 | Rabinowitz | 359/291 |

* cited by examiner

*Primary Examiner*—Evelyn A. Lester

(57) ABSTRACT

This invention deals with the broad general concept for dynamic reflection, illumination and direct image projection. A mini-optics reflection and focussing system is presented that ranges from interior illumination, to exterior illumination, to large scale space based illumination, to ordinary and to telescopic image formation. It can be used both as a source of illumination, and to project images, figures, and the written word. This system has broad applications such as dynamic full color displays. Its use of a novel induced dipole coupling for rotation of planar mirrors lets it operate with greater simplicity and efficiency than other display devices. Furthermore in its capacity as a high altitude active reflector of solar radiation, it can be utilized to supply illumination, energy, and provide climate control.

31 Claims, 9 Drawing Sheets

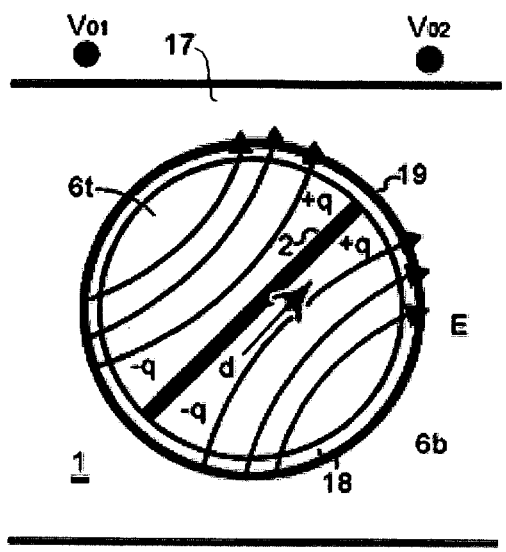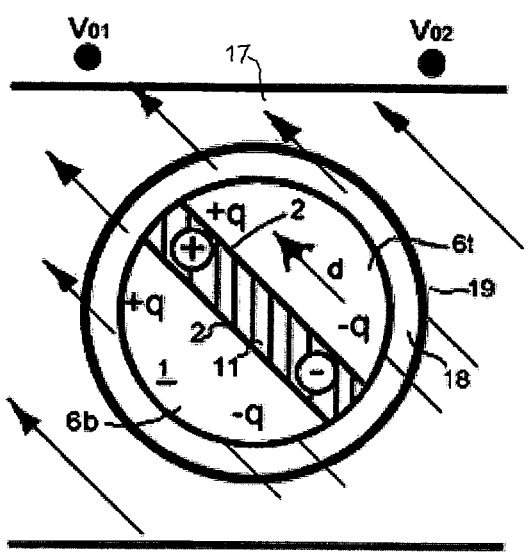
Fig. 2
Fig. 3
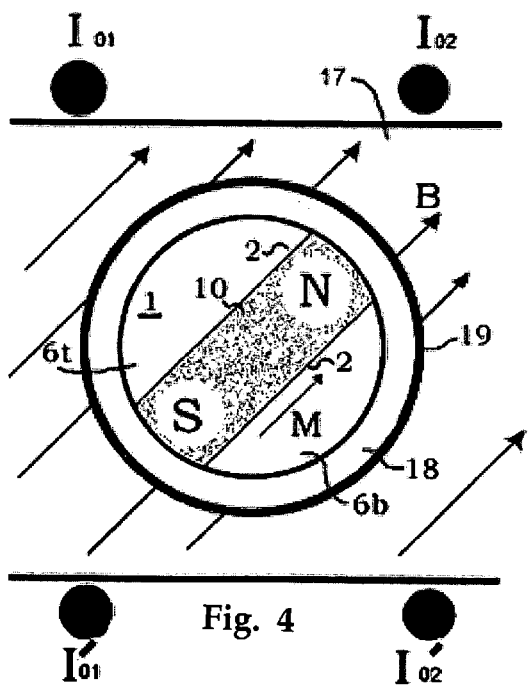
Fig. 4
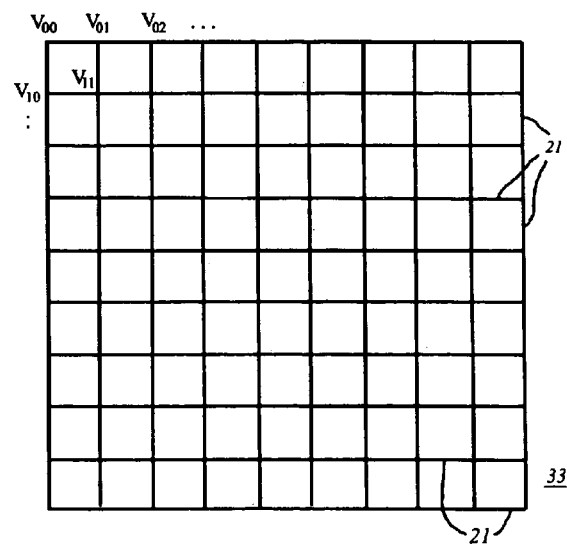
Fig. 5

DYNAMIC REFLECTION, ILLUMINATION, AND PROJECTION

INCORPORATION BY REFERENCE

The following owned in common U.S. patents, allowed patent applications, and pending patent applications are fully incorporated herein by reference:
1. U.S. Pat. No. 6,738,176, by Mario Rabinowitz and Mark Davidson, "Dynamic Multi-Wavelength Switching Ensemble" issued on May 18, 2004.
2. U.S. Pat. No. 6,612,705, by Mark Davidson and Mario Rabinowitz, "Mini-Optics Solar Energy Concentrator" issued on Sep. 2, 2003.
3. U.S. Pat. No. 6,698,693 by Mark Davidson and Mario Rabinowitz, "Solar Propulsion Assist" issued on Mar. 2, 2004.
4. U.S. Publication #2003-0193726-A1, by Mark Davidson and Mario Rabinowitz, "Active Reflection, Illumination, and Projection" published on Oct. 16, 2003.
5. U.S. Publication #2005-0034750-A1, by Mario Rabinowitz, "Spinning Concentrator Enhanced Solar Energy Alternating Current Producton" is Pending.
6. U.S. Publication #2005-0087294-A1, by Mario Rabinowitz "Manufacturing Transparent Mirrored Mini-Balls for Solar Energy Concentration and Analogous Applications" is Pending.
7. U.S. Pat. No. 6,988,809 by Mario Rabinowitz, "Advanced Micro-Optics Solar Energy Collection System" is issued on Jan. 24, 2006.
8. U.S. Pat. No. 6,964,486 by Mario Rabinowitz, "Alignment of Solar Concentrator Micro-Mirrors" issued on Nov. 15, 2005.
9. U.S. Pat. No. 6,957,894, by Mario Rabinowitz and Felipe Garcia, "Group Alignment Of Solar Concentrator Micro-Mirrors" issued on Oct. 25, 2005.
10. U.S. Pat. No. 6,843,573 by Mario Rabinowitz and Mark Davidson "Mini-Optics Solar Energy Concentrator" issued on Jan. 18, 2005.
11. U.S. Pat. 6,987,604 by Mario Rabinowitz and David V. Overhauser, "Manufacture and Apparatus for Nearly Frictionless Rotatable Array of Micro-Mirrors in a Solar Concentrator Sheet" issued on Jan. 17, 2006.
12. U.S. Publication # Not Designated Yet, by Mario Rabinowitz, "Micro-Optics Solar Energy Concentrator" is Pending.

BACKGROUND OF THE INVENTION

Field of the Invention

This invention relates generally to method and apparatus for illumination and image projection by an active reflecting mini-optics system of a dynamic ensemble of mini-mirrors. The rotatable elements of this invention are mirrored balls and cylinders. Our system can even produce moving color images from a white light input containing no image information. This contrasts with other schemes which may be characterized as "direct observation light and dark displays." Further original applications of this invention include interior and exterior lighting, a new kind of spotlight or lighthouse beacon, a building illumination system, a space-based light source for earth illumination, a reflected projection display system, and a low-cost large aperture telescope. Furthermore, the instant invention also teaches active elements such as ferrofluids which operate totally differently than the prior art.

The presence of rotatable mirrors in illumination and image projection presents either a dilemma or an opportunity with respect to the basic nature of the alignment implementation. Mirrors are normally made of a conductive metallic coating. In an applied electrostatic field, E, a dipole moment is induced in the metallic conducting material of the micro-mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. An induced electrostatic dipole in a pivoted conductor in an electrostatic field is somewhat analogous to an induced magnetic dipole in a pivoted ferromagnetic material in a magnetic field, which effect most people have experienced. When pivoted, a high aspect ratio (length to diameter ratio) ferromagnetic material rotates to align itself parallel to an external magnetic field.

If alignment is attempted in a conventional manner such as is used in Gyricon displays, the induced polarization electric dipole field in a mirror presents a dilemma since it is perpendicular to the zeta potential produced dipole field and the net vector is in neither direction. The "zeta potential," is the net surface and volume charge that lies within the shear slipping surface resulting from the motion of a body through a liquid. The zeta potential is an electrical potential that exists across the interface of all solids and liquids. It is also known as the electrokinetic potential. The zeta potential produces an electric dipole field when a sphere is made from two dielectrically different hemispheres due to their interaction with the fluid surrounding it.

One way to eliminate or greatly diminish the effect of the zeta potential is to make the surface of both hemispheres out of the same material. This would be quite difficult for Gyricon displays because they require optically different surfaces e.g. black and white, or e.g. cyan, magenta, and yellow for color mixing. In the instant invention, no problem arises by making both hemispheres out of the same transparent material to eliminate or minimize the zeta potential. In fact this presents an opportunity to both utilize the induced polarization electric dipole field and to have two mirror surfaces. With two mirror surfaces, an option presents itself to use the better surface as the surface that reflects the light, and furthermore to have a standby mirror in each element should one of the mirrors degrade. A permanent electret dipole can be sandwiched between the two induced dipole mirrors to further enhance the dipole field that interacts with the addressable alignment fields.

The topic of the dipole interactions between balls seems not to have been discussed in the Gyricon patents and literature. A heuristic analysis shows that this is not a serious problem. The electric field strength of a dipole, $E_d$ is proportional to $1/r^3$, where r is the radial distance from the center of the dipole. The energy in the field is proportional to $(E_d)^2$. Thus the energy of a dipole field varies as $1/r^6$. The force is proportional to the gradient of the field, and hence varies as $1/r^7$. With such a rapid fall off of the dipole interaction force, it can generally be made very small compared to the force due to the applied field E, and to the frictional forces that are normally present. Therefore interaction of the dipole field forces between mirrored elements (balls or cylinders) can generally be made negligible.

Advantage of Focusing

A presently preferred maximum for the diameter of elements 1 is ~10 mm or more. The minimum diameter of elements 1 can be assessed from the Rayleigh limit $$d = \frac{0.61\lambda}{n\sin u} \sim 10\lambda,$$

where d is the minimum diameter of elements 1, λ~4000 Å is the minimum visible wavelength, n is the index of refraction ~1 of element 1 (the medium in which the incident light is reflected), and u is the half angle of the light beam admitted by elements 1. Thus d~40,000 Å ($4\times10^{-6}$ m) is the minimum diameter of elements 1.

If the focussing planar mini-mirrors concentrate the incident light by a factor of 100, the total increase in power density at a receiving surface is 100 times greater than directly incident light from the same distance. Thus a much brighter image or illumination is possible than just from the light source alone.

Color Production

Unlike gyricon displays, the top half of the balls or cylinders is transparent or translucent so the incident light can reach the mirrors in the midplane. In gyricon displays the balls are made of opaque material which reflects light diffusely, rather than specularly as in the instant invention. Tinted transparent (translucent) top halves of the balls or cylinders in the instant invention differ substantially from the painted opaque gyricon ball surfaces. For color production in the instant invention, colored light may transmit through transparent top halves to reflect at the mirrors; or white light may enter through colored translucent top halves to reflect at the mirrors and leave the balls as primary colors for mixing. Primary colors are three colors such as red, green, and blue; or red, yellow, and blue; or cyan, magenta, and yellow; etc which can be combined (mixed) in various proportions to produce any other color. Contrary to common misunderstanding, the choice of primaries is somewhat arbitrary.

Information Disclosure

In the 1998 Gyricon U.S. Pat. No. 5,717,515 of Sheridon, entitled "Canted Electric Fields for Addressing a Twisting Ball Display" as well as all other Gyricon patents, no mention is made of specular reflection from a mirror. On the contrary, means are discussed to increase diffuse reflection from the balls so the Gyricon display may easily be observed from all angles. Certainly there is no anticipation of specular reflection mirrored illumination and projection applications. Furthermore there is no mention of coupling means to the balls other than by means of the zeta potential dipole, or an electret dipole both of which are parallel to the Gyricon axis of symmetry which in the case of black and white balls goes through the vertex of the black hemisphere, the center of the sphere, and the vertex of the white hemisphere. Also there is no mention of an induced polarization electric dipole in the balls. In their dielectric balls there is an inadvertent insignificant induced polarization electric dipole in the dielectric, but it is small compared with the induced polarization electric dipole of the instant invention. Furthermore, it is parallel to the Gyricon axis of symmetry, whereas in the instant invention the induced polarization electric dipole is perpendicular to the axis of symmetry. Thus the application of the same electric field in the instant invention produces an entirely different orientation or alignment than in the Gyricon patents.

U.S. Pat. No. 5,914,805 issued to J. M. Crowley on Jun. 22, 1999 utilizes two sets of gyricon bi-colored balls "having superior reflectance characteristrics comparing favorably with those of white paper" (Abstract, first sentence) for direct observation ball display purposes. In contrast with the instant invention, it does not have focussing capability, nor the ability to directly project the image of the balls. It is intended for direct visual observation. To my knowledge, it is the only Gyricon patent that uses the word mirror, and does so in only one place in a brief, incomplete, passing manner. This is in the "Conclusion" Column 21, Lines 47–49: "As another example, balls that are black in one hemisphere and mirrored in the other might be used for some applications." There is neither drawing nor text to describe the "mirrored" surface. Since the entire patent deals with diffuse reflection of light from the hemispherical surface, one may reasonably conclude that Crowley intends mirroring of the hemispherical surface. Transparency or translucency of the balls would be required for a midplane mirror so that the incident light can reach the mirror. While Crowley speaks of transparent fluid, transparent viewing surface covering the balls, and transparent electrodes on the viewing surface, he nowhere mentions that any part of his balls is transparent. In fact it is quite clear that his balls are opaque, and the word translucent is not even mentioned. This is in stark contrast with the instant invention where a planar mirror below a transparent or translucent hemisphere is explicitly described in both drawing and text.

Definitions

"Bipolar" refers herein to either a magnetic assemblage with the two poles north and south, or an electric system with + and – charges separated as in an electret.

"Collimated" refers herein to an approximately parallel beam of light.

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Electrophoresis or Electrophoretic" is an electrochemical process in which colloidal particles or macromolecules with a net electric charge migrate in a solution under the influence of an electric current. It is also known as cataphoresis.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. The dynamic-focussing property of an ensemble of tiny elements which make up the focussing planar mirror are an essential feature of the instant invention.

"ITO" is a thin conducting alloy of Indium/Tin Oxide that is transparent.

"Pixel" refers to the smallest element of an array of elements that make up an image.

"Polar gradient" as used herein relates to magnetic optical elements that are controlled in the non-gyricon mode such as in the magnetic field gradient mode.

"Monopolar" as used herein denotes mono-charged optical elements that are controlled in the non-gyricon mode such as the electrophoretic mode.

"Primary colors" are three colors such as red, green, and blue, or red, yellow, and blue which can be combined (mixed) in various proportions to produce any other color.

"Rayleigh limit" relates to the optical limit of resolution which can be used to determine the smallest size of the elements that constitute a mini-mirror. Lord Rayleigh discovered this limit from a study of the appearance of the diffraction patterns of closely spaced point sources.

"Specular reflection" occurs when the angle of reflection is equal to the angle of incidence of a light ray relative to a line perpendicular to the macroscopic reflecting surface, and they lie in the same plane with it. Thus the reflected light ray travels in a definite predictable direction.

"Spin glass" refers to a wide variety of materials which contain interacting atomic magnetic moments. They possess a form of disorder, in which the magnetic susceptability undergoes an abrupt change at what is called the freezing temperature for the spin system.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Translucent" (tinted transparent covering surface) as used herein refers to materials that pass or transmit light of only certain wavelengths so that the transmitted light is colored.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

SUMMARY OF THE INVENTION

There are many aspects and applications of this invention, which provides techniques applicable individually or in combination for novel illumination techniques and their applications. Primarily this invention deals with the broad general concept of method and apparatus for active reflection, projection, and focussing of light to produce illumination or images. The illumination and the images may be static or varying. They may be colored with changing intensities and hues, or black and white with shades of grey. As will be described in detail, these objectives may be accomplished by any of a number of ways separately or in combination, as taught by our invention It is a general object of this invention to provide an illumination planar mini-optic system for active reflection of light which can produce a substantially higher power density than the incident light.

Another objective is to provide a mini-optical active reflecting light illumination system.

Another object is to provide a mini-optical mirror active reflecting light display system.

Another object is to provide a mini-optical mirror active reflecting light display system for image formation.

Another object is to provide a mini-optical mirror active reflecting light display in which an induced electric dipole in each mirror is used for orientation of the mirror.

Another aspect is to provide a mini-optical active reflecting light display system for creating images from a white light input containing no image information.

One aspect of our invention is to provide a mini-optical active reflecting light projection system.

Another objective of the present invention is to provide an active reflection space-based light source for illumination of ground, or above ground installations.

Another aspect of our invention is to provide a new kind of active reflection lighthouse beacon, Another objective is to provide an active reflection building illumination system.

Another object is to provide a novel low-cost large aperture telescope

Other objects and advantages of the invention will be apparent in a description of specific embodiments thereof, given by way of example only, to enable one skilled in the art to readily practice the invention as described hereinafter with reference to the accompanying drawings.

BRIEF DESCRIPTION OF THE DRAWINGS

FIG. 2 is a cross-sectional view of a rotatable element with an induced dipole micro-mirror aligned at a tilted angle with respect to the surface of the single transparent sheet confining sheet. An ensemble of such elements are a major constituent of a dynamic reflection, illumination, and projection ensemble.

FIG. 3 is a cross-sectional view of a rotatable element with an electret dipole sandwiched between induced dipole micro-mirrors aligned at a tilted angle with respect to partitioned electrodes where an ensemble of such elements are a major constituent of a dynamic reflection, illumination, and projection ensemble.

FIG. 4 is a cross-sectional view of a ferromagnetic bipolar sphere with an equatorial flat reflecting surface. This sphere is one of a multitude of optical elements, which are a major constituent of a dynamic reflection, illumination, and projection ensemble.

FIG. 5 is a schematic top view showing an electronic control grid for rotating the reflecting elements of a dynamic reflection, illumination, and projection ensemble.

DETAILED DESCRIPTION OF THE PRESENTLY PREFERRED EMBODIMENTS

Figure 1A:
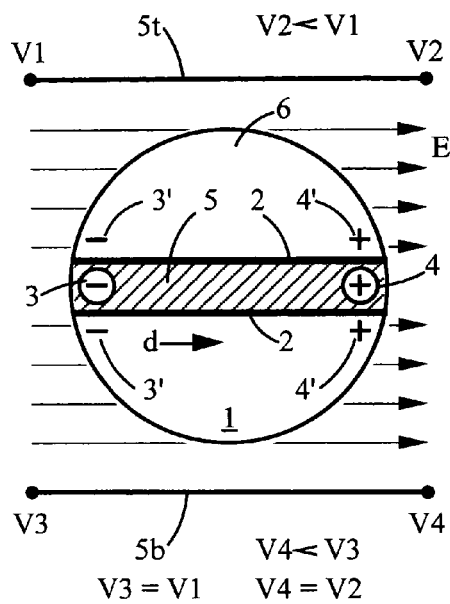
FIG. 1a is a cross-sectional view of a rotatable element with an electret dipole sandwiched between induced dipole micro-mirrors aligned parallel to partitioned electrodes where an ensemble of such elements are a major constituent of a dynamic reflection, illumination, and projection ensemble.

As is described here in detail, the objectives of the instant invention may be accomplished by any of a number of ways separately or in combination, as taught by my invention FIG. 1a is a cross-sectional view of a rotatable element 1 with an electret dipole 5 with negative charge '3 at one end and positive charge 4 at the other end sandwiched between micro-mirrors 2 aligned parallel to top partitioned highly resistive electrode 5t and bottom partitioned highly resistive electrode 5b, where an ensemble of such elements and electrodes actively reflect and focus an incident beam of light as a major constituent of a dynamic reflection, illumination, and projection ensemble. The micro-mirrors 2 are shiny circular flat conducting metal close to the equatorial plane of the elements 1. A micro-processor sends signals via bus bars to establish voltages from a power supply to each partitioned electrode which is made of a highly resistive conductor. To admit incident light, the top electrodes need to have a small cross sectional area, or be transparent such as a thin transparent alloy of indium tin oxide (ITO). For top partitioned electrode 5t, the left corner is at voltage V1 and the right corner is at voltage V2. For bottom partitioned electrode 5b, the left corner is at voltage V3 and the right corner is at voltage V4. A signal sets the voltages so that V3=V1, V4=V2, V2<V1, and V4<V3, to produce an approximately uniform applied electric field E parallel to the electrodes 5t and 5b as shown.

The applied electric field E induces a dipole moment in the metallic conducting material of the micro-mirrors 2. This is because when a metallic conductor is placed in an electric field, the charge distributes itself so as to produce a field free region inside the conductor. To internally cancel the applied field E, negative, –, free electrons move to the end of each conducting micro-mirror 2 opposite to the direction of E, leaving positive + charge at the end in the direction of E. The torque interaction of the induced electric dipole moment of the micro-mirrors 2 and the electric field E acts to align the micro-mirrors 2 parallel to the electric field E as shown here in FIG. 1a. The torque is proportional to the product of E and the dipole moment.

An electret 5 is used to augment the torque. In equilibrium i.e. when the rotation is complete, the polarization due to the electret 5 and that due to the induced charges of the conducting micro-mirrors 2 add together to produce a total dipole moment d parallel to the micro-mirrors 2, and parallel to the dominant applied electric field E. The positive + end 4 and the negative – end '3 of the electret 5 align themselves parallel to the electric field E due to the torque interaction of the permanent electric dipole moment of the electret 5 and the applied electric field E, which is proportional to their vector cross product. Since the electret 5 and its dipole moment are parallel to the micro-mirrors 2, this torque interaction aligns the micro-mirrors 2 parallel to the applied electric field E.

The presence of the electret 5, enhances the torque. In the absence of the electret 5, the dipole moment induced in the micro-mirrors 2 can be sufficient to produce alignment. However, the additional torque provided by the electret 5 helps to overcome frictional effects and produces faster alignment, which is important for projection of moving figures. In this embodiment, the hemispheres 6 are made of the same transparent material which minimizes the effect of the zeta potential. The material in the top half of element 1 in all the figures needs to be transparent or translucent so the incident light can reach the reflecting surface 2.

In operating by means of an induced polarization dipole field, the instant invention operates by a substantially different mechanism than in Gyricon displays. The instant invention also differs substantially from Gyricon displays in terms of the axis of symmetry of the elements 1, i.e. the balls or cylinders. In Gyricon displays, the axis of symmetry of their balls and cylinders is parallel to the applied electric field since the zeta potential dipole is parallel to the applied electric field. In the instant invention, the axis of symmetry of the elements 1 is perpendicular to the applied electric field because the micro-mirrors 2 and hence the induced polarization dipole field is perpendicular to the axis of symmetry. It should be noted that here in FIG. 1a, the electric field E orientation is at right angles to that which is used in Gyricon displays. Here E is parallel to the equatorial plane of the balls and the top surface 5t which admits light. In traditional Gyricon displays, E is perpendicular to the Gyricon ball equatorial plane and to the top surface—the viewing surface which admits light.

Figure 1B:
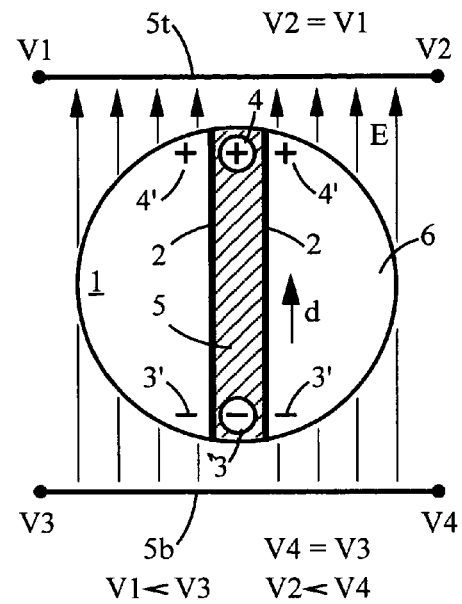
FIG. 1b is a cross-sectional view of a rotatable element with an electret dipole sandwiched between induced dipole micro-mirrors aligned perpendicular to partitioned electrodes where such elements are a major constituent of a dynamic reflection, illumination, and projection ensemble.

FIG. 1b is a cross-sectional view of a rotatable element 1 with an electret dipole 5 of negative – end '3 and positive + end 4 sandwiched between induced dipole micro-mirrors 2 aligned perpendicular to top partitioned highly resistive electrode 5t and bottom partitioned highly resistive electrode 5b, where an ensemble of such elements and electrodes are a major constituent of a dynamic reflection, illumination, and projection ensemble. For top partitioned electrode 5t the left corner is at voltage V1 and the right corner is at voltage V2. For bottom partitioned electrode 5b, the left corner is at voltage V3 and the right corner is at voltage V4. A signal sets the voltages so that V2=V1, V4=V3, V1<V3, and V2<V4, so that an approximately uniform dominant applied electric field E is produced perpendicular to the electrodes 5t and 5b as shown. The micro-minors 2 align themselves parallel to the applied electric field E due to the induced dipole field polarization of the mirrors, and permanent dipole of the electret 5.

Figure 1C:
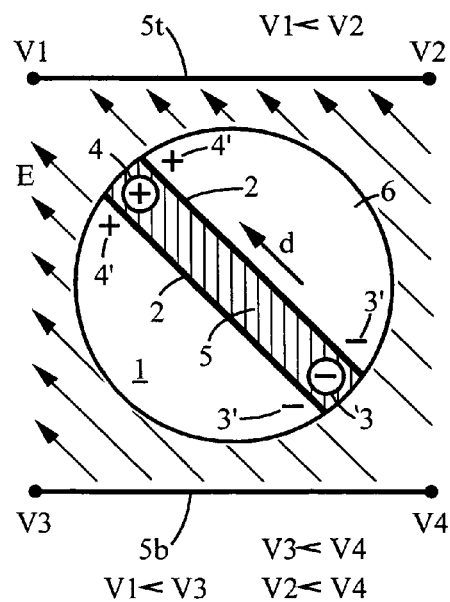
FIG. 1c is a cross-sectional view of a rotatable element with an electret dipole sandwiched between induced dipole micro-mirrors aligned at a tilted angle with respect to partitioned electrodes where such elements are a major constituent of a dynamic reflection, illumination, and projection ensemble.

FIG. 1c is a cross-sectional view of a rotatable element 1 with an electret dipole 5 with negative charge '3 at one end and positive charge 4 at the other end sandwiched between induced dipole micro-mirrors 2 aligned at a tilted angle with respect to top partitioned highly resistive electrode 5t and bottom partitioned highly resistive electrode 5b, where an ensemble of such elements and electrodes are a major constituent of a dynamic reflection, illumination, and projection ensemble. For top partitioned electrode 5t, the left corner is at voltage V1 and the right corner is at voltage V2. For bottom partitioned electrode 5b, the left corner is at voltage V3 and the right corner is at voltage V4. A signal sets the voltages so that V1<V2, V3<V4, V1<V3, and V2<V4, so that an approximately uniform dominant applied electric field E is produced that is tilted with respect to to the electrodes 5t and 5b as shown. The micro-mirrors 2 align themselves parallel to the electric field E due to the induced dipole field polarization of the mirrors, and permanent dipole of the electret 5. For balls, two-axis rotation is possible by additional alignment of the micro-mirrors 2 out of the plane of the paper. Cylinders would be restricted to single-axis rotation.

Figure 1D:
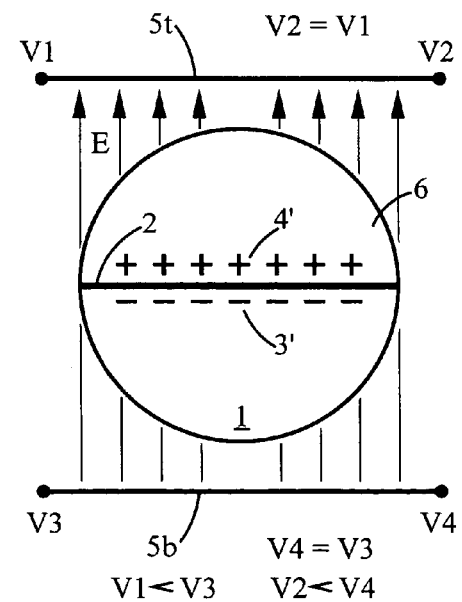
FIG. 1d is a cross-sectional view of a rotatable element that does not use an electret, showing an induced dipole micro-mirror in an unstable positon of being perpendicular to the applied electric field. From this unstable position it will rotate to an alignment in which the plane of the mirror is aligned in the direction of the applied field. An ensemble of such elements are a major constituent of a dynamic reflection, illumination, and projection ensemble.

FIG. 1d is a cross-sectional view of a rotatable element 1 showing an induced dipole micro-mirror 2 which relies soley on the induced polarization dipole field to produce alignment because the electret 5 is not used in this embodiment. The micro-mirror 2 can be either one-sided or preferably two-sided so that the dynamic reflection, illumination, arid projection ensemble can have either side up, or rotate the micro-mirror 2 a fall 360 degrees if desired. The angular orientatons possible are similarly achieved as in FIGS. 1a, 1b, and 1c and so are not shown since these figures can be easily visualized without an electret 5. As shown here in FIG. 4, with V2=V1, V4=V3, V1<V3, and V2<V4, an approximately uniform dominant electric field E is produced perpendicular to the electrodes 5t and 5b as shown. What is shown here in FIG. 4 is an unstable position of the mirror 2 perpendicular to the applied field E. From this unstable position the mirror 2 will rotate to an alignment in which the mirror is parallel to the vertically shown electric field, or to any other direction of the applied field. An ensemble of such elements are a major constituent of a dynamic reflection, illumination, and projection ensemble.

Examples of materials that are appropriate transparent dielectrics for making the elements 1 are: glass, polycarbonate, acrylic polymers made from acrylic derivatives such as acrylic acid, methacrylic acid, ethyl acrylate, methyl acrylate (some trade names are lexan, lucite, plexiglass, etc.). Electrets may be made from teflon, castor wax, carnuba wax, and other materials. A conducting, but highly resistive material such as Indium/Tin Oxide (ITO) can be sputtered on the sheets that contain the elements 1 to form the addressing electrodes. The optical transparency of ITO makes it ideally suited for addressing the balls, and need be used just on the incident light side.

FIG. 2 is a crosssectional view of a rotatable element 1 with an induced dipole micro-mirror 2 aligned at a tilted angle with respect to the top surface of a single transparent sheet 17 in the case where the dominant applied field is not uniform as shown. The element 1 has a transparent or translucent top hemisphere (or hemicylinder) 6t, and a bottom hemisphere (or hemicylinder) 6b that may be either transparent. translucent or opaque. It is necessary for the top hemisphere 6t to be transparent or translucent for light to enter and be reflected from micro-mirror 2. The bottom hemisphere 6b may be opaque, preferably with dielectric properties similar to top hemisphere 6t to minimize the effect of the zeta potential.

Colored light may transmit through transparent top halves 6t to reflect at the mirrors; or white light may enter through colored translucent top halves 6t to reflect at the mirrors and leave the balls as primary colors for mixing and projection. Primary colors are three colors such as red, green, and blue; or red, yellow, and blue; or cyan, magenta, and yellow; etc which can be combined (mixed) in various proportions to produce any other color. Configurations for producing color are shown in figures and described in detail in U.S. Publication No. 2003-0193726-A1, by Mark Davidson and Mario Rabinowitz, "Active Reflection, Illumination, and Projection" published on Oct. 16, 2003.

The induced dipole moment d of the micro-mirror 2, with induced charges +q and −q at its ends, is shown parallel to the main components of the non-uniform applied electric field E. When the electric field E is produced by grid wires rather than slabs (segmented electrodes) it is not uniform as shown. The electric field is produced in a conventional manner by application of proper voltages at the 8 vertices of each grid cube in which each element 1 is inscribed. Shown are the voltages $V_{o1}$ and $V_{o2}$ at the top left and right respectively. Similar voltages V' are at the bottom left and right.

The element 1 is completely encompassed with a lubricating fluid 18 which is encapsulated inside a concentric cavity 19 in the sheet 17. Thus the confined and lubricated element 1 can make a nearly frictionless rotation, with hardly any undesirable displacement. An ensemble of such elements can thus be aligned as a group with the application of moderate power. It is preferable to utilize a liquid 18 whose index of refraction matches the clear hemisphere or clear hemicylinder, and it should have the same density as element 1 to minimize buoyant forces. The index of refraction of the sheet 17, the liquid 18, and the optically transmissive upper portion of elements 1 should all be approximately equal. The elements 1 should be roughly balanced to minimize gross gravitational orientation.

FIG. 3 is a cross-sectional view of a rotatable element 1 with an electret dipole 11 sandwiched between induced dipole micro-mirrors 2 aligned at a tilted angle with respect to the top transparent surface of a single sheet 17, where an ensemble of such elements are a major constituent of a dynamic reflection, illumination, and projection ensemble.

The element 1 of top 6t and bottom 6b is completely covered with a lubricating fluid 18 which is encapsulated inside a concentric cavity 19. The induced dipole moment d of the micro-mirror 2, with induced charges +q and −q at its ends, is shown parallel to a uniform dominant applied electric field E. When the electric field E is produced by slabs (segmented electrodes) rather than grid wires, it is more uniform as shown. The electric field is produced by application of proper voltages at the 8 vertices of each grid cube in which each element 1 is inscribed. Shown are the voltages $V_{o1}$ and $V_{o2}$ at the top left and right respectively. Similar voltages V' are at the bottom left and right.

In the electric orientation mode of control, the induced and/or permanent electric dipole d in each ball is acted on by a torque τ, equal to the vector cross product of the electric dipole moment d, of the dipole and the electric field E:

$$\tau = d \times E$$

which has the magnitude dE sin θ, where θ is the angle between the d and E vectors. If there is no other torque acting on the ball and friction is negligible, the ball will come to rest at the null torque orientation where the vectors d and E are parallel, and the dipole moment lines up with the electric field in equilibrium.

In the instant invention, no problem arises by making both hemispheres $6t$ and $6b$ out of the same transparent material to eliminate or minimize the zeta potential. As shown, a permanent electret dipole 11 is sandwiched between the two induced dipole mirrors 2 to further enhance the dipole field d that interacts with the addressable alignment fields. This presents an opportunity to both utilize the mirror induced polarization electric dipole field and to have two mirror surfaces. With two mirror surfaces, an option presents itself to use the better surface as the surface that reflects the light, and furthermore to have a standby mirror in each element should one of the mirrors degrade.

A signal sets the voltages so that $V_{o1} < V_{o2}$, $V'_{o1} < V'_{o2}$, $V_{o1} < V'_{o1}$, and $V_{o2} < V'_{o2}$, an approximately uniform applied electric field E is produced that is tilted with respect to to the top surface of sheet 17 as shown. The micro-mirrors 2 align themselves parallel to the electric field E due to the induced dipole field polarization of the mirrors, and permanent dipole of the electret 11. For balls, two-axis rotation is possible by additional alignment of the micro-mirrors 2 out of the plane of the paper. This is accomplished by similar voltage relationships to those already described. Cylinders would be restricted to single-axis rotation. The chosen alignment, angle i.e. tilt angle of the rotatable elements 1 can be held in place by any of a number of methods described in the incorporated references. Thus during the interval between alignments, the alignment voltages may be switched off to conserve power.

FIG. 4 is a cross-sectional view of a rotatable element 1 with ferromagnetic material 10 with induced North pole N and South pole S, of dipole M, lined up as shown with an approximately uniform magnetic flux density B. This magnetically charged bipolar ball 1 with top $6t$ and bottom $6b$, has mirrors 2 sandwiching ferromagnetic material 10. The mirrors 2 themselves may themselves be ferromagnetic. For a stronger dipole M, the ferromagnetic material 10 itself may be a permanent magnet, just as an electret 11 augments the induced electric dipole field d in the mirrors for the embodiment of FIG. 4. This ball inside a top transparent single sheet 17 is one of a multitude of optical elements 1, which are a major constituent of a dynamic reflection, illumination, and projection ensemble. The element 1 is completely covered with a lubricating fluid 18 which is encapsulated inside a concentric cavity 19. Instead of voltages to produce an electric field as before, here currents I above and I' below are used to produce the magnetic alignment field B. A magnetic field generated by the four conductors nearest a desired element 1 controls its orientation as will be described next.

In the magnetic orientation mode of control, the induced and/or permanent magnetic dipole M in each ball is acted on by a torque τ, equal to the vector product of the magnetic dipole moment M, of the dipole and the magnetic field H=B/μ, where μ is the permeability of the medium:

$$\tau = M \times H$$

which has the magnitude MH sin θ, where θ is the angle between the M and H vectors. If there is no other torque acting on the ball and friction is negligible, the ball will come to rest at the null torque orientation where the vectors M and H are parallel, and the dipole moment lines up with the magnetic field lines in equilibrium. The classic example of this is a powder of iron filings which line up with field lines when placed near a permanent magnet. Orientation of the magnetic field can be controlled by small magnetic circuits with one or more coils placed around the ball mirror. In the most general case three orthogonal coils whose currents are controlled by electronic means can provide for three independent orthogonal components of the magnetic field and thus for arbitrary orientation of the ball. This can most easily be achieved by different means, one of which is by using a high permeability material such as mu metal to route the magnetic field lines to the desired position around the ball. The ball would be in the gaps of the magnetic circuits and they would be arranged so that the field produced by each are orthogonal to the fields of the other circuits at the position of the rotating ball. The magnetic ball would rotate to line up with the net vectorial external field, which can be quickly changed for each switching operation.

FIG. 5 is a schematic top view showing an electronic control grid 33 for matrix addressing of the rotational alignment of the mirrored elements 1. This grid 33 can be laid on the bottom of the sheet 17, on the top and bottom of sheet 17, on the top of sheet 17 with a ground plane on the bottom of sheet 17, etc. In order to avoid having several similar looking figures, this schematic may be thought of as a representation of any of several addressing arrays. It may be a wire grid array with the vertical wires on top of sheet 17, and the horizontal wires on the bottom of sheet 17. It may be an actual connected grid with Thin Film Transistors (TFTs) at the junctions. In this case it is preferable to use Polymer based TFTs for flexibility. The grid 33 is preferably a segmented array for the production of nearly uniform fields with each highly resistive square being separate and insulated from adjacent slabs. In this case, the horizontal and vertical lines represent insulation between adjacent segments or slabs. Where necessary, the grid or slabs may be made of a thin conducting alloy of Indium/Tin Oxide (ITO) that is transparent. The common element of all of these electrostatic embodiments is the ability to impress the voltage $V_{ij}$ at the ij th node either statically or impressed by means of a travelling wave. To minimize power dissipation, it is desirable to make resistive components 21 highly resistive so that a given voltage drop is accomplished with a minimum of current flow and hence with a minimum of power dissipation.

As previously described, the elements 1 are capable of rotating in any direction (two-axis response) in responding to a selectively applied electric field by the electronic control grid 33. The electronic control grid 33 is made of resistive components 21. In one embodiment, the elements 1 are sandwiched between the resistive electronic control grid 33 and a transparent ground plane. The orientation of the elements 1 is determined by controlling the voltages V at the nodes of the grid such as those shown $V_{00}$, $V_{01}$, $V_{02}$, $V_{10}$, $V_{11}$ with voltage $V_{ij}$ at the ij th node. The voltage $V_{ij}$ can be controlled by a small inexpensive computer with analog voltage outputs. The electronic control grid 33 is similar in construction and function to analogous grids used in personal computer boards, in flat panel monitors, in Gyricon displays, and in E-ink displays. Similarly, small offset ferritic current loops around each cell can provide local magnetic fields for the orientation function of elements with magnetic dipoles to line up with the net external magnetic vector.

Application of a voltage between successive nodes can produce an electric field in the plane of the planar mini-mirror. Application of a voltage between a node and the ground plane can produce an electric field perpendicular to the planar micro-mirror array to control the orientation angle of the dynamic micro-mirrors. In the case of elements 1 which contain a combination of orthogonal electric and magnetic dipoles, the orientation function may be separated for orientation in the plane and orientation perpendicular to the plane by each of the fields.

In the magnetic case, each square represents a current loop where adjacent loops are electrically isolated from each other. Orientation of the magnetic field and hence alignment of the balls can be controlled by small magnetic circuits with one or more current loops (coils) placed around each mirrored ball. In the most general case three orthogonal coils whose currents are controlled by electronic means can provide for three independent orthogonal components of the magnetic field and thus for arbitrary orientation of a ball. This can most easily be achieved by different means, one of which is by using a high permeability ferritic material such as mu metal to route the magnetic field lines to the desired position around the ball.

Figure 6:
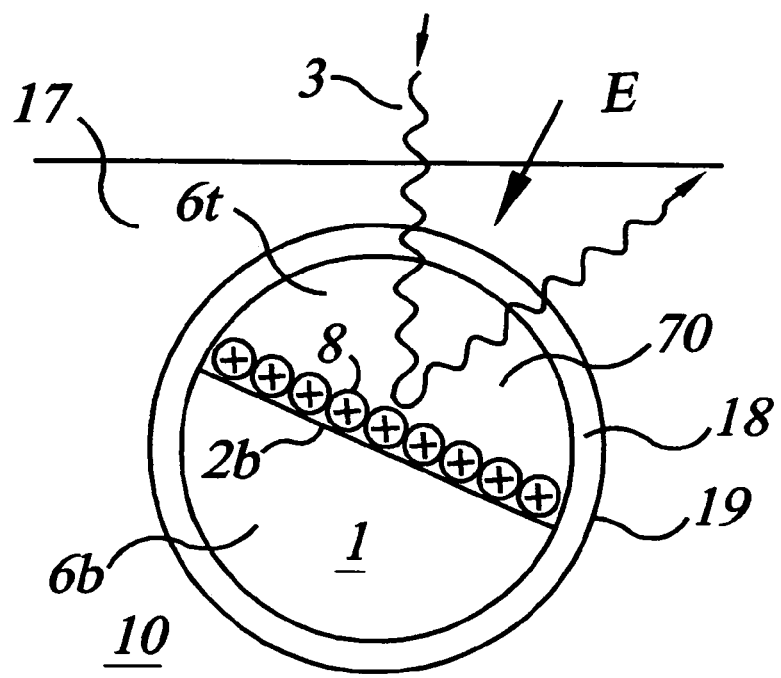
FIG. 6 is a cross-sectional view of a mirrorable electric fluid cell with a mirror formed from a colloidal suspension of dispersed shiny electrical particles in the fluid. This cell is one of a multitude of optical elements which are a major constituent of a dynamic reflection, illumination, and projection ensemble.

FIG. 6 is a cross-sectional view of a mirrorable element 1 of transparent top 6t and transparent or opaque bottom 6b, which as shown is a cell filled with a colloidal suspension of dispersed shiny electrical particles 8, shown here to be positive +, but which may be negative. This cell is one of a multitude of optical elements 1 which are a major constituent of a dynamic reflection, illumination, and projection ensemble. This electrophoretic mirror formation utilizes particles 8 that are electrically charged, polarized, or polarizable, and highly reflecting in large aggregate form, but may be transparent when dispersed in the transparent fluid 70 in the top 6t, when they are considerably less than the wavelength of the incident radiation i.e. <<4000 Å ($4 \times 10^{-7}$ m). In the case when these particles 8 are polarized, or polarizable, the particles 8 are coated to prevent aggregation in the zero electric field case. When a focussing gradient external electric field E is applied, the particles aggregate to form a mirror on the rigid surface 2b perpendicular to the applied field, whose direction can be changed as is described above in conjunction with the permanently formed mirrored balls. It is preferable to utilize a fluid 18 surrounding element 1 whose index of refraction matches element 1 (the clear hemisphere or clear hemicylinder), and it should have the same density as element 1 to minimize buoyant forces. The index of refraction of the top transparent single sheet 17, the liquid 18, and the optically transmissive upper portion of elements 1 should all be approximately equal. Fluid 70 should have the same properties as fluid 18, except that it may have a different density. Fluid 18 is confined by the cavity 19 in the single sheet 17.

The orientation of this flat mirrored surface can be controlled by an electric field E by inducing an electric dipole in the formed mirror as described in conjunction with FIG. 3, to reflect light 3. Until the electric field E is applied, as an optional capability the particles 8 and the fluid 70 can function as a transparent window when the particles 8 are nanosize i.e. much smaller than the wavelength of the incident light and the fluid 70 is transparent or translucent while they are dispersed in the fluid 70. For the case of dispersed transparency, the particles 8 should be <<4000 Å ($4 \times 10^{-7}$ m). This cell is one of a multitude of optical elements 1 which focus light for dynamic reflection, illumination, and projection. The particles 8 may include a wide variety of electomagnetically interactive materials such as electret, optoelectric, conducting, thermoelectric, electrophoretic, resistive, semiconductive, insulating, piezoelectric, or spin (e.g. spin glass) materials.

The element 1 cells are typically sandwiched between a transparent top electrode (e.g. Indium Tin Oxide) and a smaller bottom electrode so that the electric field lines converge toward the transparent bottom electrode. When the bottom electrode is of positive polarity, or there is no electric field E the particles are dispersed in widely separated positions in the fluid 70 presenting either a transparent, translucent, non-reflecting, or diffuse reflection surface to an incident light beam. When the bottom electrode is of negative polarity, the particles move together toward the rigid surface 2b and form a tight mirrored surface on rigid surface 2b. This migration with increased density at the mirrored surface 2b forms a suitable reflecting micro-mirror.

Figure 7:
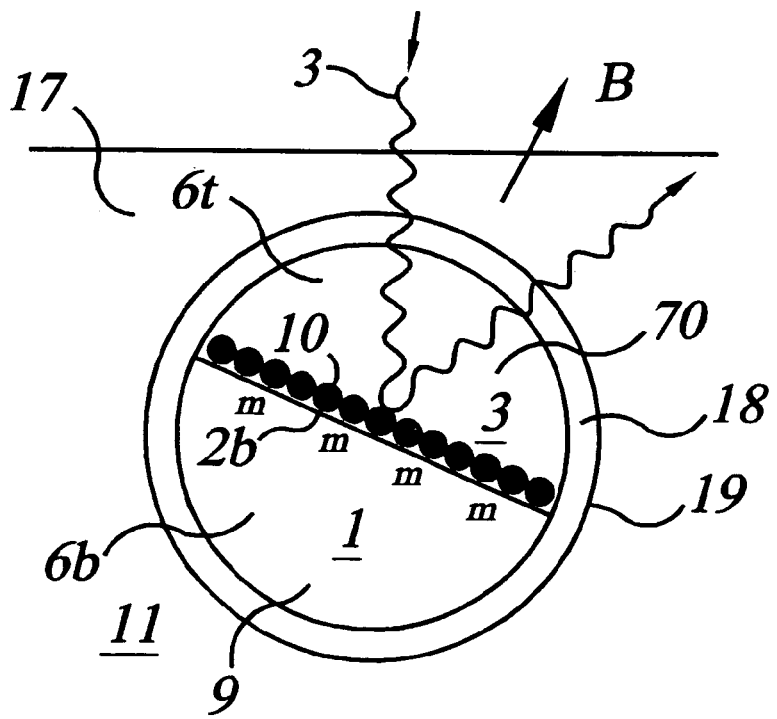
FIG. 7 is a cross-sectional view of a mirrorable ferrofluid cell with a mirror formed from a colloidal suspension of shiny ferromagnetic particles in the fluid. This cell is one of a multitude of optical elements which are a major constituent of a dynamic reflection, illumination, and projection ensemble.

FIG. 7 is a cross-sectional view of a mirrorable element 1 of transparent top 6t and transparent or opaque bottom 6b, which is a ferrofluid cell filled as shown with a colloidal suspension of dispersed shiny magnetic particles 10, also indicated by the symbol m. This cell is one of a multitude of optical elements 1 which focus light for dynamic reflection, illumination, and projection. This magnetophoretic mirror formation utilizes ferromagnetic particles 10 that are permanently magnetically polarized, or polarizable, and highly reflecting in large aggregate form, but may be transparent when dispersed in the transparent fluid 70 in the top 6t, when they are considerably less than the wavelength of the incident radiation i.e. <<4000 Å ($4 \times 10^{-7}$ m). In the case when these particles 10 are polarized, or polarizable, the particles 10 are coated to prevent aggregation in the zero magnetic field case. When a focussing external magnetic field B is applied, the particles aggregate to Loon a mirror on the rigid surface 2b perpendicular to the applied magnetic field, whose direction can be changed as is described above in conjunction with the balls with permanently formed minors. It is preferable to utilize a fluid 18 surrounding element 1 whose index of refraction matches element 1 (the clear hemisphere or dear hemicylinder), and it should have the same density as element 1 to minimize buoyant forces. The index of refraction of the top transparent single sheet 17, the liquid 18, and the optically transmissive upper portion of elements 1 should all be approximately equal. Fluid 70 should have the same properties as fluid 18. except that it may have a different density. Fluid 18 is confined by the cavity 19 in the single sheet 17.

The orientation of this flat mirrored surface can be controlled by the magnetic field B to reflect light 3. Until the magnetic field B is applied, as an optional capability the magnetic particles 10 and the fluid 70 can function as a transparent window when the particles 10 are nanosize i.e. much smaller than the wavelength of the incident light and the fluid 70 is transparent or translucent while they are dispersed in the fluid 70. For the case of dispersed transparency, the magnetic particles 10 should be <<4000 Å ($4 \times 10^{-7}$ m). This cell is one of a multitude of optical elements 1 which focus light for dynamic reflection, illumination, and projection. The particles 10 may include a wide variety of electomagnetically interactive materials such as magnetic, ferromagnetic, paramagnetic, diamagnetic, or spin (e.g. spin glass) materials.

The element 1 cells are typically in a focusing top magnetic field so that the magnetic field lines converge toward the rigid surface 2b. When there is no magnetic field B the particles are dispersed in widely separated positions in the fluid 70 presenting either a transparent, translucent, non-reflecting, or diffuse reflection surface to an incident light beam. When an inhomogeneous electromagnetic field B of increasing gradient is applied, the particles 10 are drawn to the region of increasing gradient and coalesce to form a flat reflecting mirror on rigid surface 2*b*. The magnetic particles move together toward the rigid surface 2*b* forming a tight mirrored surface. This migration with increased density at the mirrored surface 2*b* produces a suitable reflecting micro-mirror.

Once formed, the orientation of the flat mirrored surface can be controlled by the magnetic field B by rotation of the element 1 as described in conjunction with FIG. 5, or even an electric field by inducing an electric dipole in the formed mirror as described in conjunction with FIG. 3, to properly reflect light 3. This cell is one of a multitude of optical elements 1 which focus the light 3 for dynamic reflection, illumination, and projection. The particles 10 are small enough to form a colloidal suspension, and are coated to prevent coalescence until B is applied.

Figure 8:
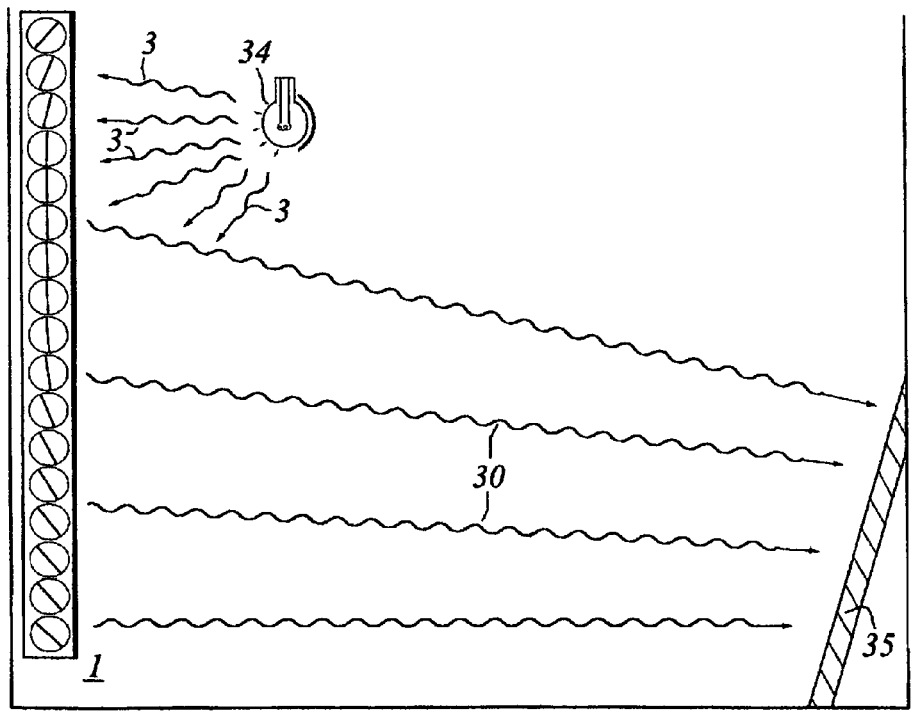
FIG. 8 illustrates an actively reflecting system for controllable area illumination.

FIG. 8 illustrates an actively reflecting system for controllable area illumination. A light source 34 sends incident light 3 to a mini-optics ensemble of reflecting elements 1, which reflects and focusses the reflected light 30 unto a surface 35. This permits the illuminated area to be controlled in intensity, area, and color. All these parameters may be varied as a function of time and space to create a new dimension in interior design. This system can replicate the balanced spectrum of natural light. It can create natural, glare-free light to allow one to see with comfort and ease, even in a windowless room. It can provide sharp visibility. It can make the illuminated surface 35 uplifting, cheerful and bright for reading, for hobbies, for working, as well as providing a relaxing living or work space. This mini-reflecting light source can produce a changeable artistic design of emanating light in the space between the light source 34, the walls, and on all impinged surfaces.

Figure 9:
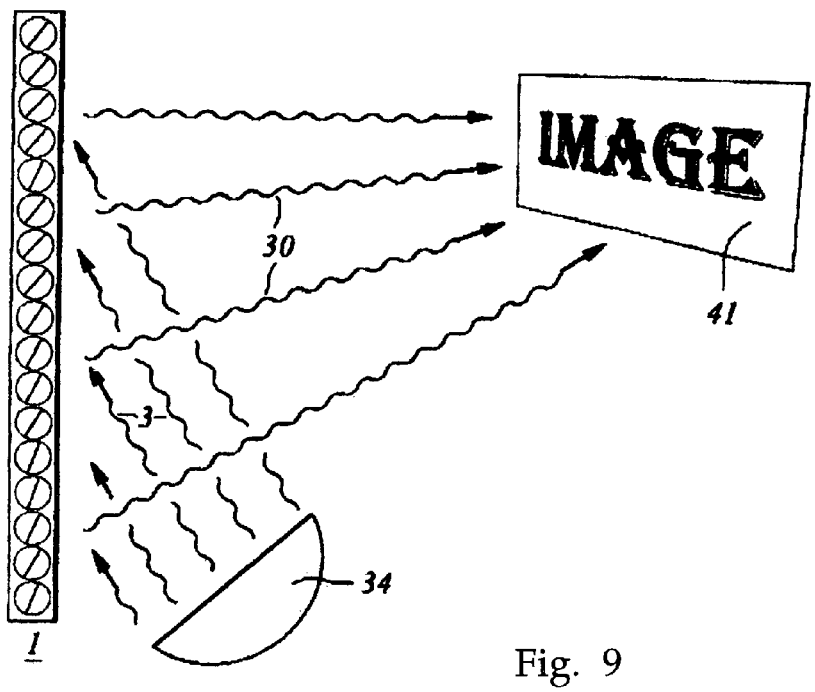
FIG. 9 illustrates an actively reflecting projection display.

FIG. 9 illustrates an actively reflecting projection display. A light source 34 sends incident light 3 to a mini-optics ensemble of reflecting elements 1, which reflects and focusses the reflected light 30 to form an IMAGE 41. The image 41 may vary from written material to artistic scenery, and from black and white to colored. The image 41 may be large or small; and may be interior or exterior as on the facade of a building. The image 41 may produce a light display on building walls. The image 41 may make the illuminated surface into a panorama of changing shapes and color designs. This mini-optics ensemble of reflecting elements 1, can produce information such as advertising and figures on an impinged surface such as a wall. Instead of writing on sheets with the balls inside as in the prior art, the instant invention creates on a separate surface: writing, color images, and much more than can be done by the prior art.

Figure 10:
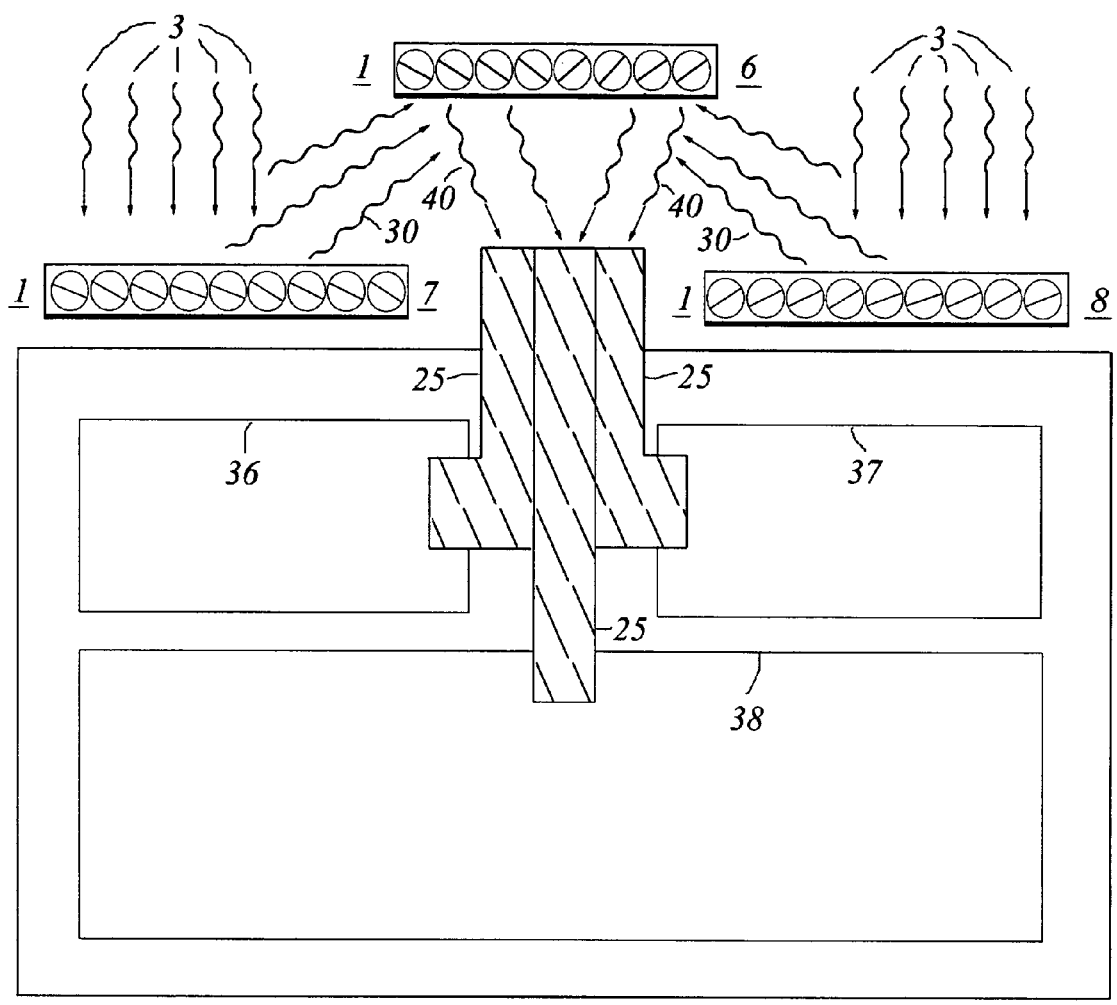
FIG. 10 illustrates an actively reflecting mini-optics building illumination system.

FIG. 10 illustrates an actively reflecting mini-optics building illumination system. Shown are a cross-sectional view of three sets of mini-optics ensembles 6, 7, and 8 of rotatable elements 1 wherein sunlight 3 is incident on the first ensemble 6 and the reflected light 30 from this first ensemble 6 is focussed on the second and third ensemble 7 and 8 to reflect light 40 which is further concentrated and focussed onto transmitters 25 (such as fiber optics cable) to be piped into a building structure. The degree of concentration of solar light 40 reaching the transmitters 25 is increased by utilizing two or more focussing planar mini-mirrors 6, 7 and 8 as shown. The transmitters 25 bring this light 40 to illuminate various rooms 36, 37, and 38 of the building which many also utilize actively reflecting mini-optics ensembles. The sun's light may be transmitted by means other than a fiber optic bundle to be piped to various rooms. For example, the sun's light may be reflected to a series of other reflectors (either ordinary or mini optics reflectors such as 6, 7, and 8) to disperse it into the building.

Figure 11:
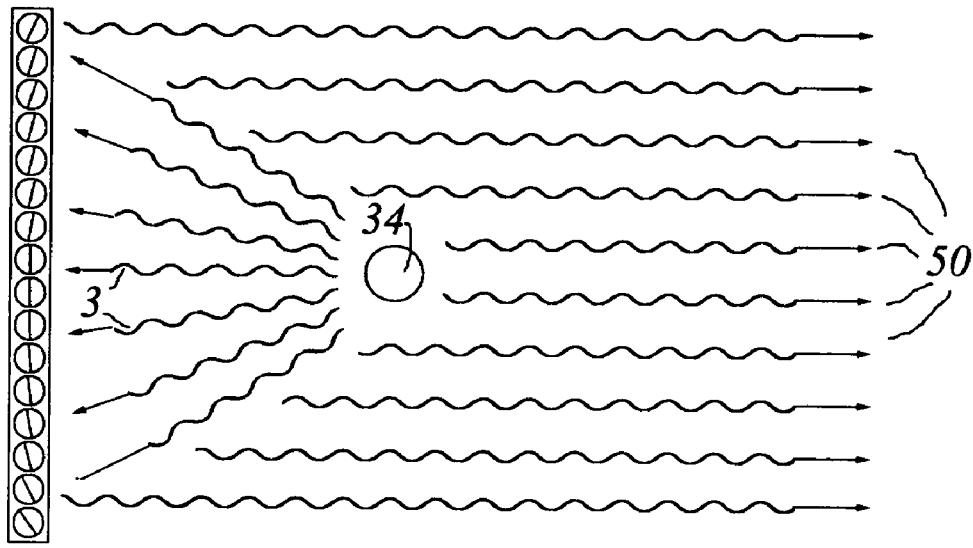
FIG. 11 illustrates an actively reflecting focussed spotlight or lighthouse beacon.

FIG. 11 shows in cross-section an actively reflecting focussed spotlight or lighthouse beacon wherein a primary light source 34 sends light 3 incident onto a mini-optics ensemble of reflecting elements 1, which reflect and form a colliminated parallel beam of light 50. In this lighthouse beacon or spot light, the primary light source 34 can remain stationary, and the mini-optics ensemble of reflecting elements 1, does the rotating to move the light beam around.

If the source point is very distant, then the incoming radiation is collimated. An example where the source point is distant is where the reflecting mirror system is being used to reflect sunlight, or starlight as for a telescope. An example where the detector point is very far away, is when the reflecting mirror system is being used as a spotlight or lighthouse beacon.

Figure 12:
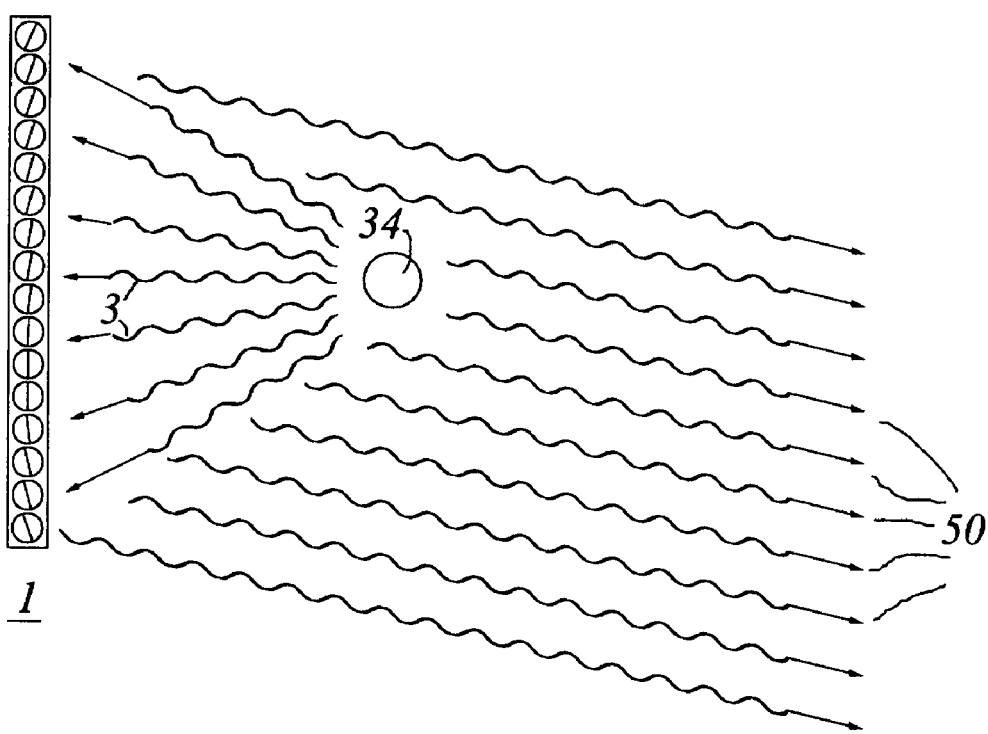
FIG. 12 illustrates an actively reflecting focussed spotlight or lighthouse beacon showing rotation of the beam, although the light source remains stationary.

FIG. 12 illustrates an actively reflecting focussed spotlight or lighthouse beacon showing rotation of the beam, although the light source remains stationary. Shown in cross-section is an actively reflecting focussed spotlight or lighthouse beacon wherein a primary light source 34 sends light 3 incident onto a mini-optics ensemble of reflecting elements 1 which have rotated to reflect and form a colliminated parallel beam of light 50 in a new direction, without motion from the light source 34. Among the advantages of this mode of operation is the ease of beam rotation compared to rotating a light source 34 which may have a large moment of inertia. Another advantage is that the support structure for the light source 34 does not have to withstand a large centrifugal force.

Figure 13:
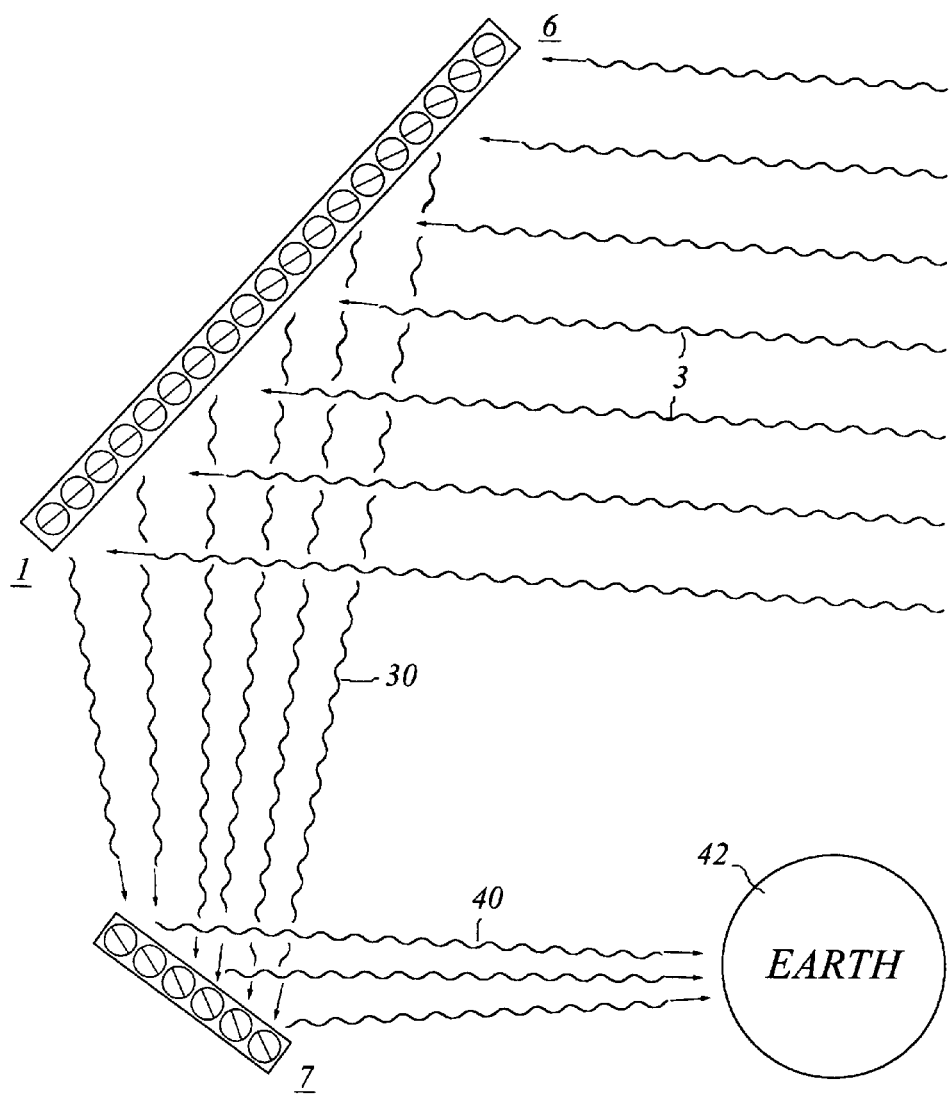
FIG. 13 illustrates a space-based mini-optics actively reflecting illumination system.

FIG. 13 illustrates a space-based orbiting mini-optics actively reflecting illumination/energy system. Shown are a cross-sectional view of two sets of mini-optics ensembles 6, and 7 of rotatable elements 1 wherein sunlight 3 is incident on the first ensemble 6 and the reflected light 30 from this first ensemble 6 is focussed on a second ensemble 7 to reflect light 40 which is further concentrated and focussed onto a collecting region of the EARTH 42.

To illustrate the amplification capability of this configuration, in the ideal case where all the incident light is reflected without absorption or losses, if the two sets of focussing planar mini-mirrors each concentrated the light energy by a factor of 10, the total increase in power per unit area reaching the collector would be a factor of $10^2=100$ times greater than the incident power density. For n such reflectors each feeding into the other until finally reaching the collector, the increase would be $10^n$. In this process, as in any passive optical system, the brightness as measured in power per unit area per solid angle cannot be increased, and so there is an upper limit to the concentration. Optical aberrations would cause the concentration to fall short of this ideal. In practice, each successive stage of concentration would become less effective due to aberrations as it must focus light having larger and larger cone angle and consequently more severe aberrations. If the light source is thermal radiation at temperature T, then the second law of thermodynamics places a limit on the brightness of the radiation such that it can never be brighter than black body radiation at that same temperature. In this case the radiation can also never be used to passively heat an object to a temperature greater than T. For the sun, the temperature of the radiation reaching the earth is about 6,000 degrees Kelvin.

Figure 14:
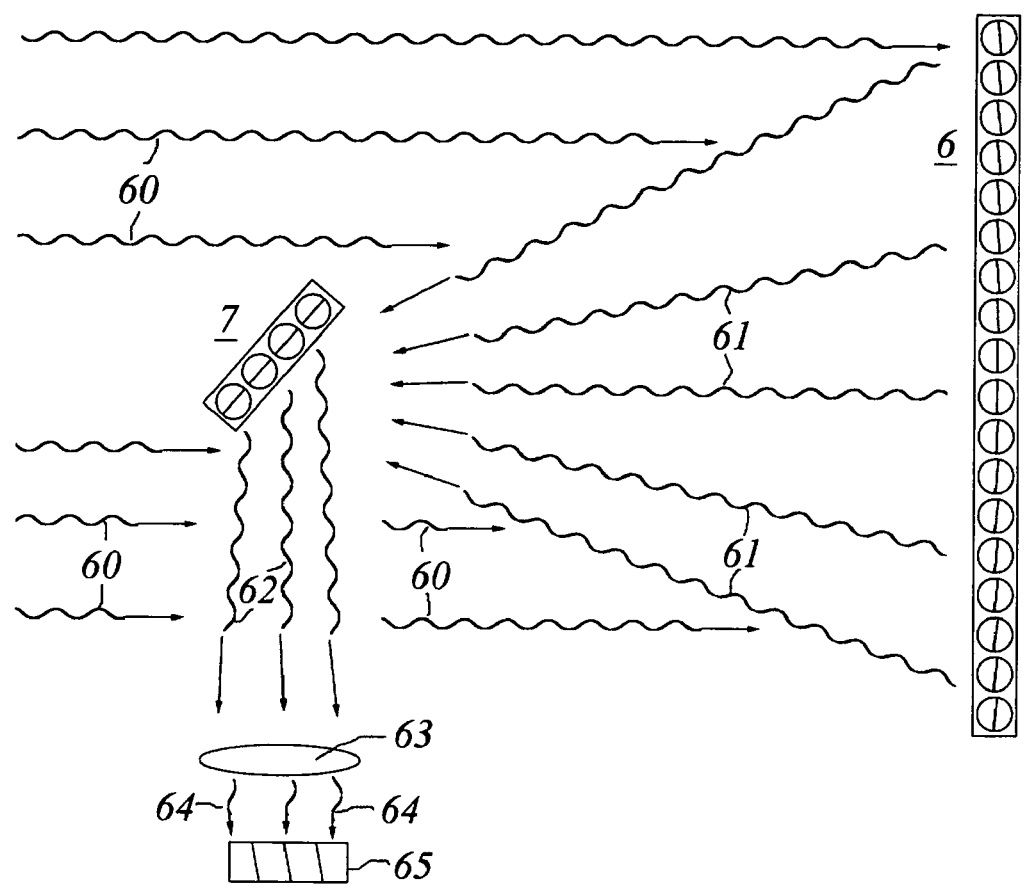
FIG. 14 is a cross-sectional view of an actively reflecting mini-optics large aperture telescope for viewing the image at right angles to the telescope axis.

FIG. 14 is a cross-sectional view of an actively reflecting mini-optics large aperture telescope for viewing the image at right angles to the telescope axis. Shown are a cross-sectional view of two sets of mini-optics ensembles 6 and 7 of rotatable elements 1 wherein starlight 60 is incident on the first ensemble 6. The reflected light 61 from this first ensemble 6 is focussed on a second ensemble 7 where it is reflected at right angles as light 62. (A small plane mirror or totally reflecting prism may be used instead of the ensemble 7.) Light 62 is further concentrated and focussed onto a lens system 63 which sends the transmitted light 64 to an imaging detector 65. The imaging detector 65 may be a camera, photocells, photomultiplier, or other imaging devises.

Most astronomical observations are no longer made visually, but rather photographically or electronically. That is why modern astronomical telescopes are more precisely cameras rather than telescopes. Most of the big telescopes make use of large, heavy, expensive, concave mirrors which must be ground to great precision. These cumbersome mirrors must be supported carefully to maintain their precision. They are vulnerable to temperature changes which can distort their optical properties. The actively reflecting mini-optics of the instant invention avoids these problems by active electronic adjustment of the individual mini-mirrors, even after installation. Thus larger overall aperture and lower cost is possible than with bulky, cumbersome ground glass telescopic mirrors. The virtue of the instant invention is the capability for a large light gathering aperture area, which would presently be at the expense of lower resolution.

Figure 15:
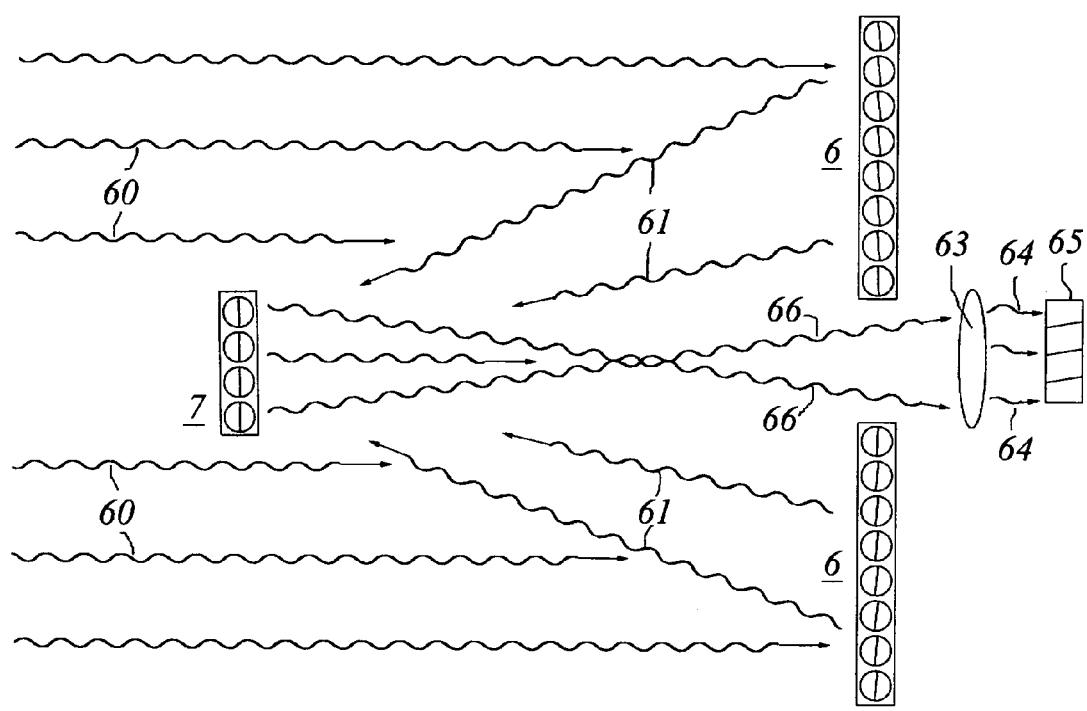
FIG. 15 is a cross-sectional view of an actively reflecting mini-optics large aperture telescope for viewing the image parallel to the telescope axis.

FIG. 15 is a cross-sectional view of an actively reflecting mini-optics large aperture telescope for viewing the image parallel to the telescope axis. Shown are a cross-sectional view of two sets of mini-optics ensembles 6 and 7 of rotatable elements 1 wherein starlight 60 is incident on the first ensemble 6. The light 61 from this first ensemble 6 is focussed on a second ensemble 7 where it is reflected and focussed as light 66. (A small convex mirror may be used instead of the ensemble 7. Another possibility is to replace the ensemble 7 with the imaging detector 65 so no opening would be necessary in the ensemble 6.) Light 66 is further concentrated and focussed onto a lens system 63 which sends the transmitted light 64 to an imaging detector 65.

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims.

The invention claimed is:

1. A miniature mirrored reflecting optics system for projecting a reflected light image, comprising:
    a) an array of rotatable planar mirrors in balls embedded in cavities in an optically transmissive sheet;
    b) means for producing an induced dipole in each of said rotatable planar mirrors;
    c) opposingly faced pairs of electrodes in a grid array for coupling to said induced dipole;
    d) means for selectively addressing a pair of said electrodes;
    e) means to individually rotate the mirrors within said sheets; and
    f) an image receiving and viewing surface for said reflected light image formation by said mirrors.

2. The apparatus of claim 1, wherein said induced dipole is an electric dipole.

3. The apparatus of claim 1, wherein said induced dipole is a magnetic dipole.

4. The apparatus of claim 1, wherein an electret is placed adjacent to each micro-mirror so that its permanent electric dipole is parallel to said induced dipole.

5. The apparatus of claim 1, wherein a magnet is placed adjacent to each micro-mirror so that its permanent magnetic dipole is parallel to said induced dipole.

6. The apparatus of claim 1, wherein said rotatable planar mirrors includes primary colors of light including at least one red tinted transparent hemispherical surface, one yellow tinted transparent hemispherical surface, and one blue tinted transparent hemispherical surface.

7. The apparatus of claim 1, wherein said rotatable miniature mirrors includes at least one transparent surface for receiving each incident primary colors of light including red light, yellow light, and blue light.

8. The apparatus of claim 1, wherein said reflected light image is a moving image formed by coherent rotation of said planar mirrors.

9. The apparatus of claim 1, wherein said reflected light image is a telescopic image formed by coherent focusing of said planar mirrors.

10. A miniature mirrored reflecting optics system for illuminating a surface, comprising:
    a) an array of rotatable planar mirrors in balls embedded in cavities in an optically transmissive sheet;
    b) means for producing an induced dipole in each of said rotatable planar mirrors;
    c) opposingly faced pairs of electrodes in a grid array for coupling to said induced dipole;
    d) means for selectively addressing a pair of said electrodes;
    e) means to individually rotate the mirrors within said sheets; and
    f) an illumination receiving and viewing surface to be illuminated by reflected light from said mirrors.

11. The apparatus of claim 10, wherein said induced dipole is an electric dipole.

12. The apparatus of claim 10, wherein said induced dipole is a magnetic dipole.

13. The apparatus of claim 10, wherein said reflected light illuminates a building by coherent focusing of said planar mirrors.

14. The apparatus of claim 10, wherein said reflected light forms a beacon by coherent focusing of said planar mirrors into the air.

15. The apparatus of claim 10, wherein said reflected light illuminates a portion of the earth from a high altitude by coherent focusing toward the earth of said planar mirrors in an elevated miniature mirror reflecting optics system.

16. A method of projecting a reflected image provided by an array of miniature mirrors, comprising the steps of:
    a) placing an array of rotatable planar mirrors in balls embedded in cavities in an optically transmissive sheet;
    b) producing an induced dipole in each of said rotatable planar mirrors;
    c) coupling to said induced dipole by means of opposingly faced pairs of electrodes in a grid array;
    d) selectively addressing a pair of said electrodes;
    e) providing means to rotate said array of miniature mirrors;
    f) focusing said reflected light unto a given remote location; and
    g) providing an image receiving and viewing surface upon which said reflected image is focused.

17. The method of claim 16, wherein said induced dipole is an electric dipole.

18. The method of claim 16, wherein said induced dipole is a magnetic dipole.

19. The method of claim 16, further comprising the step of embedding an electret adjacent to each mirror for rotating each rotatable miniature mirror.

20. The method of claim 16, further comprising the step of producing a telescopic image formed by coherent focusing of said planar mirrors upon a viewing surface.

21. A method of illuminating a surface provided by an array of miniature mirrors, comprising the steps of:
   a) placing an array of rotatable planar mirrors in balls embedded in cavities in an optically transmissive sheet;
   b) producing an induced dipole in each of said rotatable planar mirrors;
   c) coupling to said induced dipole by means of oppositely faced pairs of electrodes in a grid array;
   d) selectively addressing a pair of said electrodes;
   e) providing means to rotate said array of miniature mirrors;
   f) focusing said reflected light unto a given remote location; and
   g) providing an image receiving arid viewing surface upon which said reflected image is focused.

22. The method of claim 21, wherein said induced dipole is an electric dipole.

23. The method of claim 21, wherein said induced dipole is a magnetic dipole.

24. A miniature mirrorable reflecting optics system for projecting a reflected light image, comprising:
   a) an array of rotatable cells embedded in an optically transmissive sheet;
   b) a receptive surface in each of said cells;
   c) transparent fluid contained in said cells;
   d) micro-particles dispersed in said fluid;
   e) a formed rotatable planar mirror of said micro-particles on said receptive surface;
   f) means for producing an induced dipole in each of said rotatable planar mirrors;
   g) a field to rotate said planar mirror; and
   h) an image receiving and viewing surface upon which said projected image is focused.

25. The apparatus of claim 24, wherein said dipole is electric.

26. The apparatus of claim 24, wherein said dipole is magnetic.

27. The apparatus of claim 24, wherein said micro-particles are a ferrofluid.

28. A method of illuminating a surface provided by an array of miniature mirrors, comprising the steps of:
   a) providing micro-particles dispersed in a fluid in cells in an optically transmissive sheet;
   b) forming rotatable planar mirrors in said cells;
   d) providing a coupling field to rotate said planar mirrors; and
   e) providing an illumination receiving and viewing surface to be illuminated by reflected light from said mirrors.

29. The method according to claim 28, wherein said field is electric.

30. The method according to claim 28, wherein said field is magnetic.

31. The method of claim 28 further comprising the step of rotating an array of reflecting ferrofluid mirrors.

* * * * *